(12) United States Patent
Krishan et al.

(10) Patent No.: US 11,936,752 B2
(45) Date of Patent: Mar. 19, 2024

(54) METHODS, SYSTEMS, AND COMPUTER READABLE MEDIA FOR GENERATING AND PROCESSING BUNDLED NOTIFICATION REQUEST MESSAGES

(71) Applicant: Oracle International Corporation, Redwood Shores, CA (US)

(72) Inventors: Rajiv Krishan, Bangalore (IN); Sonal Jain, Bangalore (IN)

(73) Assignee: ORACLE INTERNATIONAL CORPORATION, Redwood Shores (CA)

( * ) Notice: Subject to any disclaimer, the term of this patent is extended or adjusted under 35 U.S.C. 154(b) by 176 days.

(21) Appl. No.: 17/732,368

(22) Filed: Apr. 28, 2022

(65) Prior Publication Data

US 2023/0353657 A1   Nov. 2, 2023

(51) Int. Cl.
*H04L 67/55* (2022.01)
*H04L 45/00* (2022.01)
*H04L 45/74* (2022.01)

(52) U.S. Cl.
CPC .......... *H04L 67/55* (2022.05); *H04L 45/20* (2013.01); *H04L 45/74* (2013.01)

(58) Field of Classification Search
CPC ........ H04L 45/20; H04L 45/74; H04L 67/55; H04L 67/56; H04L 67/566
See application file for complete search history.

(56) References Cited

U.S. PATENT DOCUMENTS

2012/0197990 A1* 8/2012 Li ................. H04L 51/066
709/204
2021/0250172 A1* 8/2021 Choyi ............. H04L 67/563
(Continued)

FOREIGN PATENT DOCUMENTS

CN    113162956 A  *  7/2021  ............ H04L 67/56

OTHER PUBLICATIONS

Commonly-Assigned, co-pending U.S. Appl. No. 17/888,022 for "Methods, Systems, and Computer Readable Media for Avoiding Sending of Duplicate Notifications for Overlapping Subscriptions at Network Function (NF) Repository Function (NRF)" (Unpublished, filed Aug. 15, 2022).

(Continued)

*Primary Examiner* — Vivek Srivastava
*Assistant Examiner* — William C McBeth
(74) *Attorney, Agent, or Firm* — Jenkins, Taylor & Hunt, P.A.

(57) ABSTRACT

A method for generating and processing bundled notification request messages includes, at a producer NF, receiving subscription request messages from consumer NFs via one or more SCPs. The method further includes obtaining and storing, from the subscription request messages validated by the producer NF, identities of SCPs within a last N hops of SCPs from the producer NF, N being an integer of at least one. The method further includes detecting an event requiring notifications to a plurality of the consumer NFs. The method further includes identifying, from the SCPs within the last N hops of SCPs from the producer NF, a group of SCPs for which the notifications can be bundled. The method further includes generating a bundled notification request message for the group of SCPs for which the notifications can be bundled. The method further includes transmitting the bundled notification request message to a first-hop SCP in the group of SCPs.

20 Claims, 7 Drawing Sheets

(56) References Cited

U.S. PATENT DOCUMENTS

2022/0060367 A1* 2/2022 Khare ............... H04L 67/55
2022/0393971 A1* 12/2022 Bartolome Rodrigo ...............
H04L 45/20

OTHER PUBLICATIONS

"3rd Generation Partnership Project; Technical Specification Group Core Network and Terminals; 5G System; Network Function Repository Services; Stage 3 (Release 17)," 3GPP TS 29.510, V17.6.0, pp. 1-306 (Jun. 2022).

"3rd Generation Partnership Project; Technical Specification Group Services and System Aspects; System architecture for the 5G System (5GS); Stage 2 (Release 17)," 3GPP TS 23.501, V17.5.0, pp. 1-568 (Jun. 2022).

"3rd Generation Partnership Project; Technical Specification Group Core Network and Terminals; 5G System; Technical Realization of Service Based Architecture; Stage 3 (Release 17)," 3GPP TS 29.500, V17.6.0, pp. 1-126 (Mar. 2022).

"3rd Generation Partnership Project; Technical Specification Group Core Network and Terminals; 5G System; Network Function Repository Services; Stage 3 (Release 17)," 3GPP TS 29.510, V17.5.0 pp. 1-298 (Mar. 2022).

Fielding et al., "Hypertext Transfer Protocol (HTTP/1.1): Message Syntax and Routing," Internet Engineering Task Force (IETF), Request for Comments: 7230, pp. 1-89 (Jun. 2014).

* cited by examiner

METHODS, SYSTEMS, AND COMPUTER READABLE MEDIA FOR GENERATING AND PROCESSING BUNDLED NOTIFICATION REQUEST MESSAGES

TECHNICAL FIELD

The subject matter described herein relates to increasing the efficiency in subscription-related communications between producer network functions (NFs) and consumer NFs. More particularly, the subject matter described herein relates to methods, systems, and computer readable media for generating and processing bundled notification request messages.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides a service. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the type of service provided by an NF instance as well as contact and capacity information regarding the NF instance.

A service communication proxy (SCP) can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances.

In addition to the SCP, another example of an intermediate proxy that forwards traffic between producer and consumer NFs is the security edge protection proxy (SEPP). The SEPP is the network function used to protect control plane traffic that is exchanged between different 5G public land mobile networks (PLMNs). As such, the SEPP performs message filtering, policing and topology hiding for all application programming interface (API) messages that are transmitted between PLMNs.

One problem that can occur in 5G and other types of networks is that 3GPP (and possibly other) specifications allow consumer NFs to subscribe with a given producer NF for notification of any change in a corresponding resource, and the resulting notification messages can cause an unnecessary processing burden on downstream network nodes. For example, multiple consumer NFs can subscribe with the NRF for notification based on a given NF type, NF instance, etc. In another example, multiple policy control functions/session management functions/access and mobility management functions (PCFs/SMFs/AMFs) can subscribe with a user defined register (UDR) for user profiles or operator specific data. In yet another example, multiple consumer NFs can subscribe with a network data analytics function (NWDAF) for notification, for example, of analytical data.

When an event occurs at a producer NF, the producer NF is expected to generate notification messages for every accepted subscription that matches a subscription condition. This can cause the producer NF and network to be required to send a blast of notification requests, which may contain the same or similar event information, and thus cause unnecessary stress/overload in the network. If the producer NF or intermediate SCP(s) implements overload and discard mechanisms, then such mechanisms can lead to discarding or dropping of notification request messages, which results in consumer NFs being inconsistent with each other for the same resource.

Until a notification request message is delivered to a consumer NF, all intermediate entities are required to process multiple requests. This can lead to increased processing latency of notification and other service requests. Because overloaded intermediate nodes can drop notification requests, the magnitude of the problem is greater on the operator network and intermediate nodes when the notification request is required to be delivered to consumer NFs in different PLMNs.

Accordingly, in light of these and other difficulties, there exists a need for improved efficiency in the delivery of notification messages to consumer NFs.

SUMMARY

According to one aspect of the subject matter described herein, a method for generating and processing bundled notification request messages is provided. The method includes, at a producer NF, receiving subscription request messages from consumer NFs via one or more SCPs. The method further includes obtaining and storing, from the subscription request messages validated by the producer NF, identities of SCPs within a last N hops of SCPs from the producer NF, N being an integer of at least one. The method further includes detecting an event requiring notifications to a plurality of the consumer NFs. The method further includes identifying, from the SCPs within the last N hops of SCPs from the producer NF, a group of SCPs for which the notifications can be bundled. The method further includes generating a bundled notification request message for the group of SCPs for which the notifications can be bundled. The method further includes transmitting the bundled notification request message to a first-hop SCP in the group of SCPs for which the notifications can be bundled.

According to another aspect of the subject matter described herein, obtaining the identities of SCPs within the last N hops of SCPs from the producer NF includes reading the identities of the SCPs from via headers in the subscription request messages.

According to another aspect of the subject matter described herein, identifying the group of SCPs for which the notifications can be bundled includes identifying subscriptions for which notification request messages can traverse the same SCPs between the producer NF and the SCPs within the last N hops of SCPs from the producer NF.

According to another aspect of the subject matter described herein, identifying the group of SCPs for which the notifications can be bundled includes identifying SCPs within the last N hops of SCPs from the producer NF that support notification request message bundling for notifications of a given type.

According to another aspect of the subject matter described herein, generating the bundled notification request message includes adding, to the bundled notification request message, a vendor-bundle-via header containing the identities of the SCPs in the group of SCPs for which the notifications can be bundled.

According to another aspect of the subject matter described herein, generating the bundled notification request message includes adding custom data to the bundled notification request message to change a body or a header of an individual notification request message for a particular consumer NF.

According to another aspect of the subject matter described herein, the method for generating and processing bundled notification request messages includes, at the first-hop SCP, receiving the bundled notification request message and determining whether a vendor-bundle-via header is present in the bundled notification request message.

According to another aspect of the subject matter described herein, the method for generating and processing bundled notification request messages includes, at the first-hop SCP, in response to determining that the vendor-bundle-via header is present, determining whether an identity of the first-hop SCP is present in the vendor-bundle-via header.

According to another aspect of the subject matter described herein, the method for generating and processing bundled notification request messages includes, in response to determining that the identity of the first-hop SCP is present in the vendor-bundle-via header, determining whether the identity of the first-hop SCP is first in the vendor-bundle-via header, and, in response to determining that the first-hop SCP is first in the vendor-bundle-via header, unbundling the bundled notification request message and sending individual notification request messages to the consumer NFs.

According to another aspect of the subject matter described herein, the method for generating and processing bundled notification request messages includes, in response to determining that the identity of the first-hop SCP is present in the vendor-bundle-via header, determining whether the identity of the first-hop SCP is first in the vendor-bundle-via header, and, in response to determining that the first-hop SCP is not first in the vendor-bundle-via header, determining whether a next-hop SCP identified in the vendor-bundle-via header supports bundled notifications, and, in response to determining that the next-hop SCP supports bundled notifications, proxying the bundled notification request message to the next-hop SCP.

According to another aspect of the subject matter described herein, a system for generating and processing bundled notification request messages is provided. The system includes a producer network function (NF) including at least one processor. The system further includes a bundled notification request message generator for receiving subscription request messages from consumer NFs via one or more service communication proxies (SCPs), obtaining and storing, from the subscription request messages validated by the producer NF, identities of SCPs within a last N hops of SCPs from the producer NF, N being an integer of at least one, detecting an event requiring notifications to a plurality of the consumer NFs, identifying, from the SCPs within the last N hops of SCPs from the producer NF, a group of SCPs for which the notifications can be bundled, generating a bundled notification request message for the group of SCPs for which the notifications can be bundled; and transmitting the bundled notification request message.

According to another aspect of the subject matter described herein, the bundled notification request message generator is configured to obtain the identities of SCPs within the last N hops of SCPs from the producer NF by reading the identities of the SCPs from via headers in the subscription request messages.

According to another aspect of the subject matter described herein, the bundled notification request message generator is configured to identify the group of SCPs for which the notifications can be bundled by identifying subscriptions for which notification request messages can traverse the same SCPs between the producer NF and the SCPs within the last N hops of SCPs from the producer NF.

According to another aspect of the subject matter described herein, the bundled notification request message generator is configured to identify the group of SCPs for which the notifications can be bundled includes by identifying SCPs within the last N hops of SCPs from the producer NF that support notification request message bundling for notifications of a given type.

According to another aspect of the subject matter described herein, the bundled notification request message generator is configured to generate the bundled notification request message by adding, to the bundled notification request message, a vendor-bundle-via header containing the identities of the SCPs in the group of SCPs for which the notifications can be bundled.

According to another aspect of the subject matter described herein, the bundled notification request message generator is configured to generate the bundled notification request message by adding custom data to the bundled notification request message to change a body or a header of an individual notification request message for a particular consumer NF.

According to another aspect of the subject matter described herein, the system for generating and processing bundled notification request messages includes an SCP configured to operate as a first-hop SCP in the group of SCPs for which the notifications can be bundled for receiving the bundled notification request message, determining whether a vendor-bundle-via header is present in the bundled notification request message, in response to determining that the vendor-bundle-via header is present, determining whether an identity of the first-hop SCP is present in the vendor-bundle-via header.

According to another aspect of the subject matter described herein, the first-hop SCP is configured to, in response to determining that the identity of the first-hop SCP is present in the vendor-bundle-via header, determine whether the identity of the first-hop SCP is first in the vendor-bundle-via header, and, in response to determining that the first-hop SCP is first in the vendor-bundle-via header, unbundle the bundled notification request message and sending individual notification request messages to the consumer NFs.

According to another aspect of the subject matter described herein, the first-hop SCP is configured to, in response to determining that the identity of the first-hop SCP is present in the vendor-bundle-via header, determine whether the identity of the first-hop SCP is first in the vendor-bundle-via header, and, in response to determining that the first-hop SCP is not first in the vendor-bundle-via header, determine whether a next-hop SCP identified in the vendor-bundle-via header supports bundled notifications, and, in response to determining that the next-hop SCP supports bundled notifications, proxy the bundled notification request message to the next-hop SCP.

According to another aspect of the subject matter described herein, a non-transitory computer readable medium having stored thereon executable instructions that when executed by a processor of a computer control the computer to perform steps is provided. The steps are performed at a producer network function (NF): The steps include receiving subscription request messages from consumer NFs via one or more service communication proxies (SCPs). The steps further include obtaining and storing, from the subscription request messages validated by the producer NF, identities of SCPs within a last N hops of SCPs from the producer NF, N being an integer of at least one. The steps further include detecting an event requiring notifications to a plurality of the consumer NFs. The steps further include identifying, from the SCPs within the last N hops of SCPs from the producer NF, a group of SCPs for which the notifications can be bundled. The steps further include generating a bundled notification request message for the group of SCPs for which the notifications can be bundled. The steps further include transmitting the bundled notification request message to a first-hop SCP in the group of SCPs for which the notifications can be bundled.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
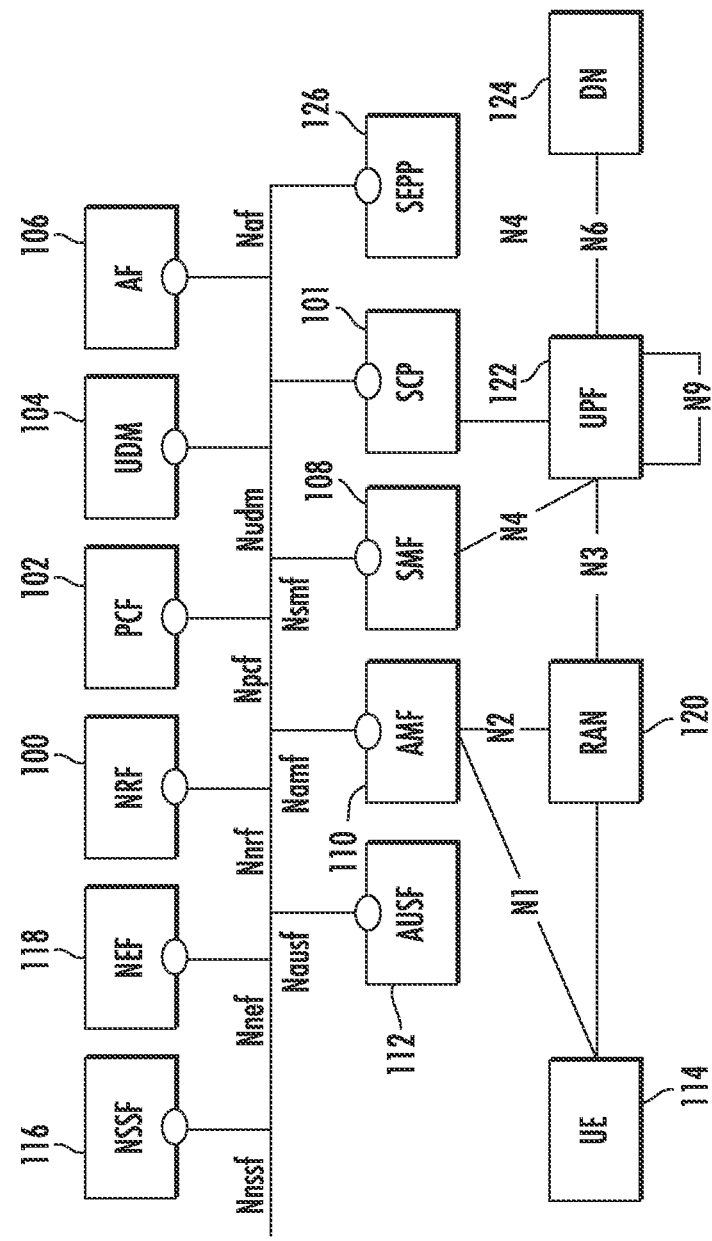
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. In order to communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a PCF 102 that performs policy related operations in a network, a user defined management (UDM) 104 that manages user data, and an application function (AF) 106 that provides application services.

The NFs illustrated in FIG. 1 further include an SMF 108 that manages sessions between AMF 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

Figure 2:
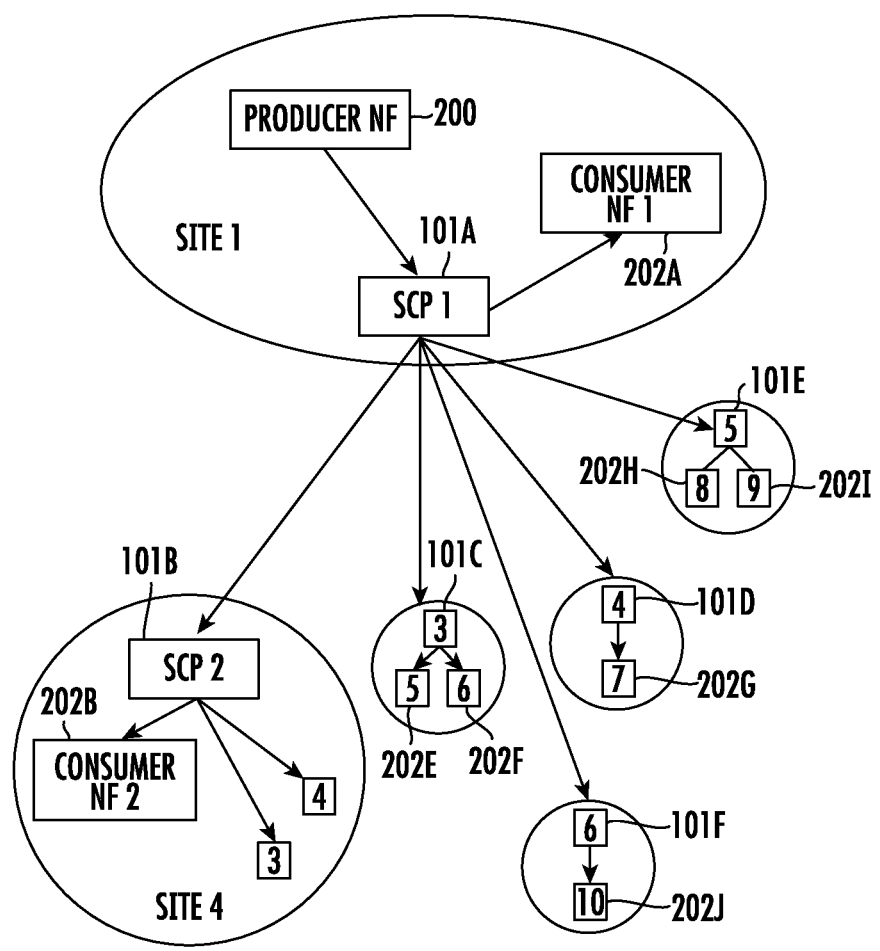
FIG. 2 is a network diagram illustrating a network architecture where duplicate notification request messages are sent to plural consumer NFs.

As stated above, one problem that can occur in 5G and other types of networks is that duplicate notification request messages for the same event sent to different consumer NFs can overload intermediate network nodes. FIG. 2 illustrates the problem in more detail. Referring to FIG. 2, a producer NF 200 provides services, and consumer NFs NF1-NF10 202A-202J subscribe to the same resource on producer NF 200. In response to detecting a notification-triggering event, producer NF 200 generates 10 individual notification request messages—one for each subscription from each of consumer NFs 202A-202J. A first-hop SCP 101A (located one SCP hop from producer NF 200) is required to route each of the ten notification request messages—one to consumer NF 202A and the remaining nine to second-hop SCPs 101B-101F. Second-hop SCPs 101B-101F each receive the number of notification request messages corresponding to the number of triggered subscriptions by consumer NFs at their respective sites and route the notification request messages to consumer NFs 202B-202J.

In this example, it is assumed that the notification request messages were triggered by the same event and thus contain largely the same content. Thus, generating and sending ten notification messages with the same or nearly the same content wastes the processing resources of producer NF 200. Routing notification messages with duplicate information wastes the processing resources of SCPs 101A-101F, with the SCPs that are nearer to producer NF 200 experiencing more wasteful processing than SCPs that are further from producer NF 200. In light of the duplicate notification request messages in the network and the resulting processing by intermediate nodes, such as SCPs, there exists a need for reducing the volume of duplicate notification request messages.

To avoid or reduce the severity of at least some of these problems, the subject matter described herein enables producer NFs to bundle notification request messages and send the bundled notification request messages to SCPs in the network. The SCPs in the network perform unbundling and route the individual notification request messages to consumer NFs. A producer NF can be configured to bundle notification request messages to be unbundled at an SCP that is located at a configurable number of SCP hops from the producer NF. In the examples described herein, the variable N is used to refer to the configurable number of SCP hops from the producer NF that generates the notification request message where unbundling occurs, where N is an integer of at least 1. Thus, the number of SCP hops is equal to the number of SCPs along a given path from the producer NF. To illustrate the concept of an SCP hop (or hop of SCPs), in FIG. 2, SCP1 101A is located one SCP hop from producer NF 200, and SCPs 101B-101F are each located two SCP hops from producer NF 200. The terms "SCP hops" and "hops of SCPs" are used interchangeably herein.

Most 3GPP-defined messages have a notification body that does not require additional data for every similar type of subscription. For example, if an NRF receives a subscription based on the same target NfType from 2 consumer NFs, NF1 and NF2, then the notification messages for consumer NFs NF1 and NF2 will have similar body content. The only difference is a few header parameters, such as path (or notification URL) or routing-binding header, which is provided by consumer NF upon subscription. The same holds true for notifications from the UDR or charging function (CHF). UDR and CHF notifications contain the following content, which is the same for most subscriptions.

UDR (operatorSpecificData)
CHF (SpendingLimitStatus)

However, there are some notification messages which require additional information specific to the subscription request. Examples of notification request messages with information specific to the request are notifications from the network data analytics function (NWDAF), which contains the following content:

NWDAF (NnwdafEventsSubscriptionNotification) contains a subscriptionId which will be unique for each notification.

The subject matter described herein is capable of generating bundled notification request messages when the notification request messages directed to different consumer NFs contain the same or nearly the same content as well as notification request messages directed to different consumer NFs and that contain different content.

By bundling notification request messages at the producer NF and structuring the messages so that they can remain bundled for a configurable number of SCP hops from the producer NF, the subject matter described herein defers the burst of notification messages to SCPs closer to consumer NFs. Thus, the subject matter described herein provides optimal network and compute resource utilization at producer NFs and intermediate SCPs.

As stated above, bundled notification request messages travel up to N levels or hops of SCPs as configured by the network operator at the producer NF. Thus, the network operator can choose to offload the generation or processing of notification request messages with duplicate content from the producer NF only (e.g., by setting N=1) or from the producer NFs and intermediate SCPs (by setting N>1).

The behavior of consumer NFs is unchanged, and not all producer NFs are required to support bundling of notification request messages. Thus, the subject matter described herein can be selectively enabled on producer NF and SCP instances to target selective flows that cause bursts of notification request messages towards multiple consumer NFs.

At the SCP level, the subject matter described herein is based on feature support for processing bundled notification request messages published by SCPs. As a result, the subject matter described herein is backward compatible for the following scenarios:

The operator network may have SCP instances from different vendors. As a result, some of the SCPs within N levels of the producer NF may lack support for handling bundled notification request messages.

Some SCPs may be executing older software versions that do not support handling of bundling request messages for given NF types.

The subject matter described herein provides a generic model to unbundle requests, which enables SCPs that are compatible with the feature to handle various different notification request message structures. Using the structure described herein for bundled notification request messages, the SCP can remain agnostic of notification request message header and body structure.

According to one aspect of the subject matter described herein, the producer NF obtains and stores the identities of SCPs that a subscription request traverses from the consumer NF to the producer NF. In one example, the producer NF obtains the SCP information by reading the information from the via headers of a subscription request message. 3GPP TS 29.500 allows SCPs to add a via request header to messages, such as subscription request messages. The SCP information obtained from subscription request messages from consumer NFs can be used by a producer NF to group or bundle notification request messages that have common SCPs in their paths.

Internet Engineering Task Force (IETF) Request for Comments (RFC) 7230 indicates that multiple via field values represent each proxy or gateway that has forwarded the message. Each intermediary appends its own information about how the message was received, such that the end result is ordered according to the sequence of forwarding recipients. Thus, a notification request message sent from a consumer NF to a producer NF via a group of SCPs will contain via headers containing the identities of the SCPs traversed by the ordered according to the order in which the SCPs were encountered. For example, in FIG. 2, the via headers for a subscription request message from consumer NF2 202B to producer NF 200 would contain via headers identifying SCP2 101B followed by SCP1 101A.

An SCP may publish its support of <NfType>_bundled_Notification handling in the Vendor-SpecificFeature parameter of its profile at NRF (during registration). Thus, a given SCP can publish its support of bundling for selected set of NfType notifications.

To facilitate bundling of notification request messages, a producer NF creates a database of SCPs required to reach each consumer NF that subscribes to receive notifications. The producer NF analyzes the data in the database to identify consumer NFs with common SCPs to trigger a minimum or reduced required number of bundled notifications based on N last hop SCPs. The producer NF generates bundled notification request messages based on unique pairs (or groups greater than 2) of N last hop SCPs involved in routing a subscription request to the producer NF.

As will be described in more detail below, in one exemplary implementation, a bundled notification request message is a 3GPP-defined notification request message with additional data, for example, to allow generation of individual notification request messages to the consumer NFs at the point where the bundled notification request message is unbundled. In one example, the producer NF adds the following additional information to a bundled notification request, which allows the SCP to perform further routing or unbundling operation:

consumer notification URL, subscription details and consumer binding information;

vendor-bundle-via: a unique group of N last hop SCPs for which a bundled notification request message was generated; and vendor-nfbundle-type: <NfType>_bundled_Notification.

In order to process bundled notification request messages, an SCP that supports such processing must, in response to receiving a bundled notification request message, identify the next-hop SCP from the vendor-bundle-via header. The SCP determines whether the next-hop SCP supports bundling for the notification type identified in the vendor-nfbundle-type custom header. If the next-hop SCP supports bundling for the identified notification type, the SCP that received the bundled notification request message forwards or proxies the bundled notification request message as is (i.e., without unbundling the notification request message) to the next-hop SCP. If the next-hop SCP does not support bundling for the notification type identified in the notification request message or there is no next-hop SCP identified in the notification request message, the SCP that receives the notification request message may unbundle the request and perform default routing for each individual notification request indicated by the bundled notification request.

As indicated above, the producer NF includes, in the bundled notification request message, a vendor-bundle-via header, which identifies the N last-hop (from furthest to nearest to the producer NF) SCPs for which the bundled notification request was generated and a vendor-nfbundle-type header, which indicates whether each SCP supports bundling for the notification type. The producer NF or SCP can perform runtime evaluation of the next-hop endpoint and their support of bundling for a given vendor-nfbundle-type. To perform runtime evaluation of a next-hop SCP's support for bundling, the SCP that receives a bundled notification request message iterates through list of paths in bundled requests and find their corresponding next-hop SCPs.

It is possible that a given bundled notification request may have a list of consumer NFs which are being served by different SCP instances. After identifying the next-hop SCPs that support bundling and those that do not support bundling, the SCP may unbundle the request, send unbundled notification request messages to the next-hop SCPs that do not support bundling, rebundle the request for the smaller subset of next-hop SCPs that support bundling, and send the re-bundled request to the next-hop SCPs that support bundling. This may or may not provide effective bundling at all due to the performance impact of having every intermediate SCP examine a bundled request for each path/consumer NF. With the N-hop bundling model described herein, all SCPs (until the last (Nth-hop) SCP can forward the bundled request to next-hop SCP without iterating through or evaluating the content in bundled request.

Using the SCP to check a next-hop SCP's compatibility with notification request bundling, unbundling the request, and rebundling the request may be advantageous because SCPs may be engineered for higher performance and lower latency than other NFs and thus are more capable of performing these tasks without a noticeable performance impact. The subject matter described herein enables bundling based on the last N hops of SCPs (in reaching the producer NF) to enable quick routing of bundled request messages between SCPs, without the need of iterating through list of paths in bundled requests to determine next hop SCP. As N increases, the amount of bundling and unbundling processing at the last hop SCPs increases, as does the benefit of fewer duplicate messages at SCPs before last hop SCP in the network.

When a producer NF receives subscription create or update request, the producer NF runs its default validation logic to accept/reject the subscription request. If a subscription request is accepted, the producer NF maintains the identities of SCPs in the last N hops (from the producer NF) of SCPs for each accepted subscription request in a database local to the producer NF. The producer NF obtains the identities of the last N hops of SCPs from the via headers received in the subscription request. It should be noted that the higher the value of N, the more notification messages the producer NF is required to generate.

Tables 1 and 2 shown below illustrate via groups identified by a producer NF for N=1 and N=2, respectively.

TABLE 1

Via Groups Identified by Producer NF for N = 1

| Subscription ID | Via Groups |
| --- | --- |
| 1 | SCP1 |
| 2 | SCP1 |
| 3 | SCP1 |
| 4 | SCP1 |
| 5 | SCP1 |
| 6 | SCP1 |
| 7 | SCP1 |
| 8 | SCP1 |
| 9 | SCP1 |
| 10 | SCP1 |

The identifiers in Table 1 refer to the SCPs and consumer NFs in FIG. 1, where subscription ID 1 is assumed to be created by consumer NF1 202A, subscription ID 2 is assumed to be created by consumer NF2 202B, etc. From Table 1, for N=1, the only common SCP for bundled notifications is SCP1 101A. In this case, producer NF 200 would generate a single bundled notification request message to SCP1 101A. SCP1 101A would unbundle the notification request message and send ten individual notification request messages—one to consumer NF 202A and nine to next-hop SCPs 101B-101F for delivery to consumer NFs 202B-202J. Thus, duplicate messaging on the link or network between producer NF 200 to SCP1 101A is reduced by a factor of 10 to 1.

TABLE 2

SCP Via Groups Identified by Producer NF for N = 2

| Subscription ID | Via Groups |
| --- | --- |
| 1 | SCP1 |
| 2 | SCP2, SCP1 |
| 3 | SCP2, SCP1 |
| 4 | SCP2, SCP1 |
| 5 | SCP3, SCP1 |
| 6 | SCP3, SCP1 |
| 7 | SCP4, SCP1 |
| 8 | SCP5, SCP1 |
| 9 | SCP5, SCP1 |
| 10 | SCP6, SCP1 |

In Table 2, producer NF 200 has identified SCPs within the last 2 hops from producer NF 200. It can be seen that subscription IDs 2-4, 5, 6, and 8, 9 have common SCP groups. As will be described below with respect to Table 3, producer NF 200 identifies unique via groups and generates bundled messages for each unique set of via groups.

When an event occurs for which a producer NF is required to provide notification, the producer NF uses existing logic to find the set of subscription IDs for which notifications will be generated. In addition, the producer NF may implement the following bundling logic to produce one or more bundled notification request messages.

Find unique via groups for the set of subscription IDs for which notification is required.
From Table 2, for N=2, if notification is to be generated for each unique set of subscription ids in the table, then there are 6 different groups of SCPs. Table 3 shown below illustrates unique via groups for the data in Table 2.

TABLE 3

Identified Via Groups

| Via Groups | Subscription IDs |
| --- | --- |
| SCP1 | 1 |
| SCP2, SCP1 | 2, 3, 4 |
| SC3, SCP1 | 5, 6 |
| SCP4, SCP1 | 7 |
| SCP5, SCP1 | 8, 9 |
| SCP6, SCP1 | 10 |

For each group with more than one subscription identity, find the last (closest to the producer NF) SCP in the group and check if that SCP supports bundling for this NF notification type in the VendorSpecificFeature parameter registered with the NRF:
    If the last SCP supports bundling for the identified notification type, then generate a bundled notification request.
        From Table 3, producer NF 200 may generate 6 notification requests (3 bundled and 3 unbundled). This results in a 40% reduction of notification messages from the producer NF over the unbundled case.
    Otherwise, generate unbundled requests for each subscription ID in that group.
Optionally allow the operator to configure an M value, which indicates a maximum bundle size in terms of individual notification request messages that can be inserted into each bundled notification request.
    The default may be to set M=−1, which means bundle all allowed requests.
    For example, if M is set to 2, then there shall be 2 notifications towards the SCP2, SCP1 group. (1 bundled for subscription IDs 2 and 3, another as unbundled for subscription ID 4)

The producer NF may perform the following operations in creating bundled notification request messages. Based on any subscription (to be used for bundling) set the notification header and body parameters as defined by 3GPP for the notification type. For example, when creating a bundled notification request for the SCP2, SCP1 group, generate notification requests for any of the subscriptions defined by subscription IDs 2,3,4. The next step is to generate and add the custom headers to the bundled notification request. The custom headers to support bundling include:
    vendor-bundle-via: Unique group of N last hop SCPs for which bundled request is being generated, e.g., SCP2, SCP1 vendor-nfbundle-type: <NfType>_bundled_Notification
All routing/request parameters are bundled as vendor specific extensions attributes—refer to section 6.6.3 of 3GPP TS 29.500.

The following is an example structure for a bundled notification request message. The illustrated parameters are generic for any type of notification. However, the producer NF can add additional parameters based on the vendor-nfbundle-type header value type.

```
"vendorSpecific-000111": {
    "version": 1,
    "routingData": [
        {
            <instance of ConsumerRoutingObject>
        }, ...
    ]
}
ConsumerRoutingObject:
{
    "path" : <Notification URL of consumer>
    "rBinding" : <Routing binding header for consumer",
    "customdata" : [
        {
            "param": <parameter name>
            "ptype": HEADER OR BODY
            "data": <value>
        },...
    ]
}
```

When an SCP receives a bundled notification request message, the SCP may perform the following operations. If the vendor-bundle-via header is present, check for self-identity (i.e., the identity of the SCP) in the header. If the SCP's own identity is not found, the previous hop made some mistake. Try to fix with the following logic:

Check If bundled support indicated by "vendor-nfbundle-type" header is present locally?
  If yes, unbundle the request and trigger further routing based on default logic.
  If not, reject the request
If found, check the next-hop SCP (i.e., SCP identify just before self-identity).
If, the SCP self-identity is the first SCP entry in vendor-bundle-via header, then unbundle the request and trigger further routing based on default logic.
If not, check bundling support indicated by the vendor-nfbundle-type header for next-hop SCP in its Vendor-SpecificFeature profile parameter registered at NRF.
  If the next-hop SCP supports required bundling, then proxy the request as is.
  Otherwise, unbundle the request and trigger further routing based on default logic.

The SCP may perform the following operations after determining that it should unbundle a bundled notification request message. The SCP iterates through the routingData in the vendorSpecific-000111 header, and, for each entry of ConsumerRoutingObject object:
  creates a copy of Notification request;
  replaces the path/URI with the value specified in the path parameter;
  if rBinding is not null, adds/updates the value of the 3gpp-Sbi-Routing-Binding header; and
  if there are any values in customdata, then based on ptype, replaces the value in the data parameter with the corresponding header or body parameter identified by the value of the param parameter.

An SCP that receives and unbundles a bundled notification request generates a response to the bundled notification request. If the SCP proxied the bundled notification request to the next hop, then the SCP proxies the response received from next-hop SCP to the previous endpoint. If the SCP has unbundled the request, then the SCP add the following custom headers to the response with consolidated responses from various endpoints:

vendor-bundle-response-<index of the entry the in ConsumerRoutingObject>: <response code><optional cause>.

Examples of respond codes are as follows:
vendor-bundle-response-1: 204
vendor-bundle-response-2: 404
vendor-bundle-response-3: 204
vendor-bundle-binding-<index of entry in ConsumerRoutingObject>: Updated binding header, if provided by the consumer NF.

It should be noted that the bundled message processing steps described herein work for notification request messages that do not have a data object as part of the notification response. Most of the notification responses do not have any return data objects. For example, NRF notifications to consumers or UDR policy data change notifications do not have return data objects. However, the subject matter described herein can be extended to enable vendor specific extensions to bundle responses from various consumer NFs, where responses need to carry data objects from consumer NFs.

Figure 3:
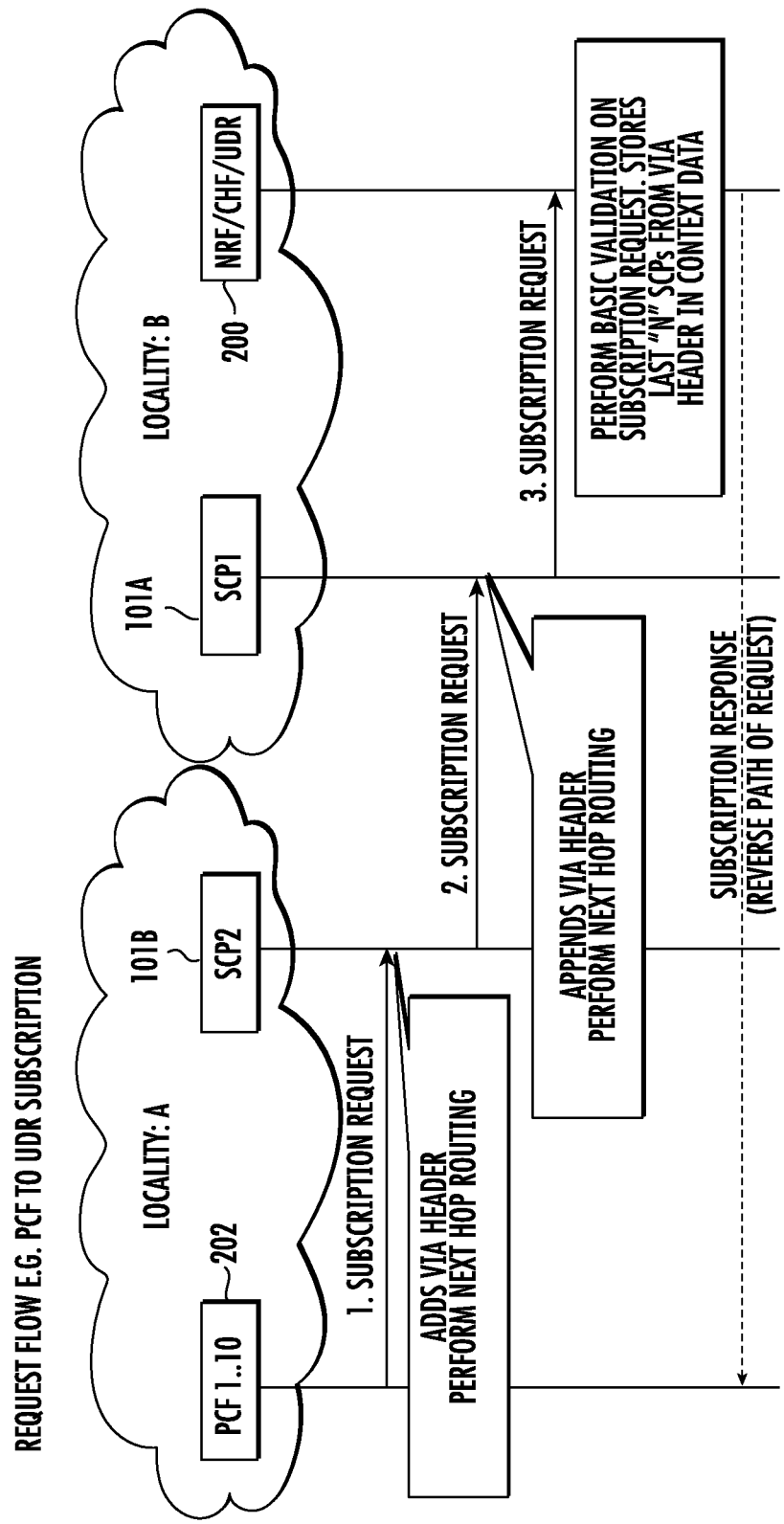
FIG. 3 is a message flow diagram illustrating exemplary messages exchanged in creating a subscription with a producer NF where the producer NF stores the identities of SCPs traversed by the subscription request that are within N hops of SCPs from the producer NF for purposes of bundling notification request messages.

FIG. 3 is a message flow diagram illustrating exemplary messages exchanged in creating a subscription with a producer NF, where the producer NF stores the identities of SCPs traversed by the subscription request that are within N hops of the producer NF for purposes of bundling notification request messages. Referring to FIG. 3, in line 1, one of a plurality of consumer NFs 202 generates a subscription request message and sends the subscription request message to producer NF 200, which in the illustrated example may be an NRF, a CHF, or a UDR. SCP2 101B receives the subscription request message and adds a via header including the identity of SCP2 101B. In line 2, SCP2 101B routes the subscription request message to next-hop SCP1 101A. SCP1 101A adds a via header with the identity of SCP1 101A to the subscription request message. In line 3, SCP1 101A routes the subscription request message to producer NF 200. Producer NF 200 validates the subscription request message, reads the identities of the last N SCPs from the via headers of the subscription request message and stores the identities of the last N SCPs in a database local to producer NF 200 as context data for the subscription. The process in FIG. 3 may be repeated for multiple subscriptions such that producer NF 200 stores the identities of the last N SCPs for each subscription.

Figure 4:
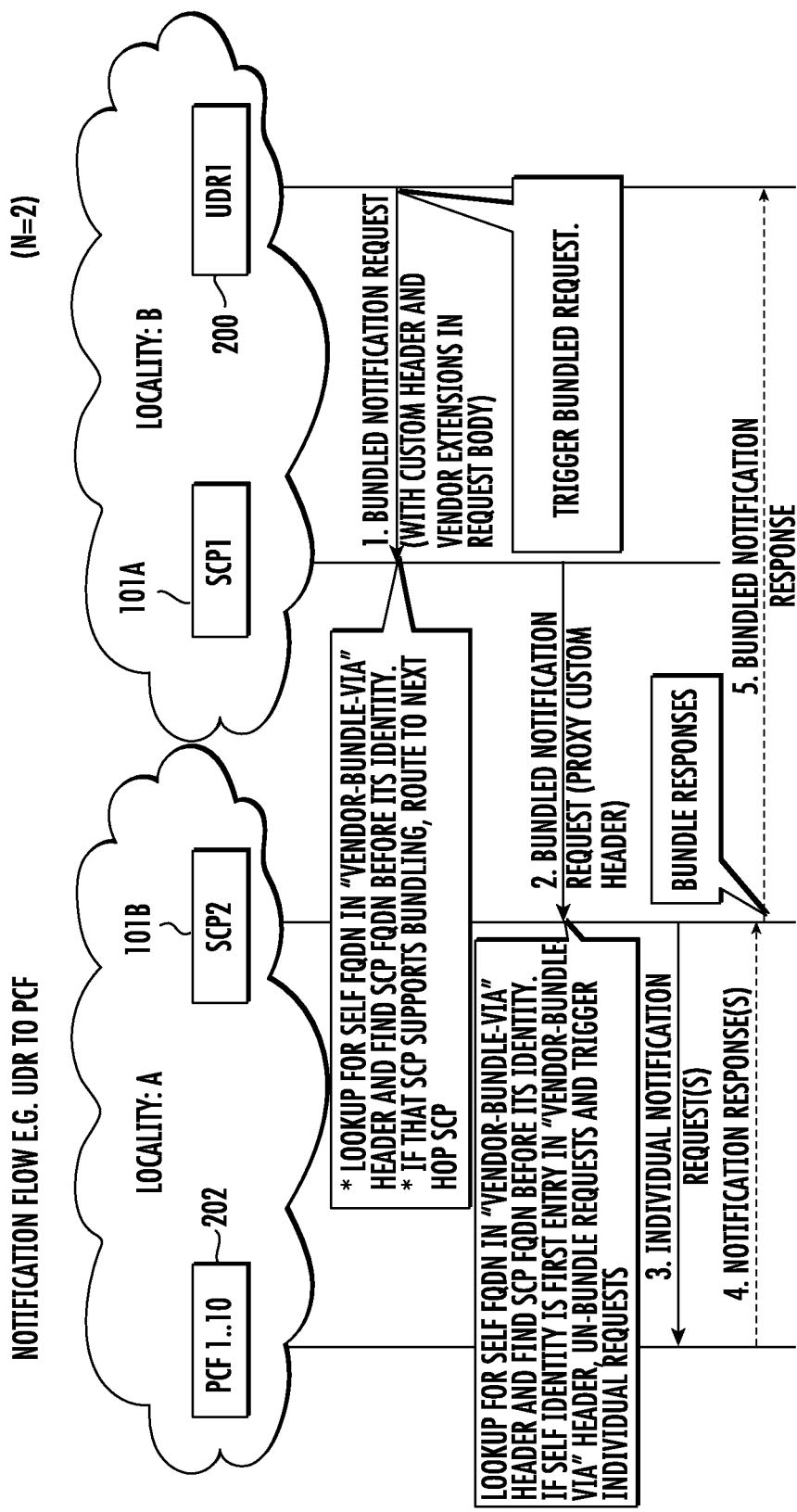
FIG. 4 is a message flow diagram illustrating exemplary messages exchanged when a producer NF generates and sends a bundled notification request message to SCPs, where N, which identifies the number of hops from the producer NF of the SCP that will perform the unbundling, is equal to 2.

FIG. 4 is a message flow diagram illustrating exemplary messages exchanged when a producer NF generates and sends a bundled notification request message to SCPs, where N=2. Referring to FIG. 4, in line 1, producer NF 200, which in the illustrated example is a UDR, detects an event requiring notification, determines that bundling is possible using the logic described above, and generates and sends a bundled notification request message to SCP1 101A. SCP1 101A receives the bundled notification request message and examines the vender-bundle-via header to determine whether the FQDN of SCP1 101A is in the vendor-bundle-via header.

If the FQDN of SCP1 101A is in the vendor-bundle-via header, SCP1 101A determines whether there is another SCP identity before the FQDN of SCP1 101A in the vendorbundle-via header. When creating the bundled notification request message, producer NF 200 may order the FQDNs of SCPs in the order in which the SCPs were added to the subscription request message. In this example, it is assumed that the order of the SCP identities in the vendor-bundle-via header is SCP2, SCP1. In this example, there is an identity of another SCP identity (i.e., the identity of SCP2) before the identity of SCP1 101A in the vendor-bundle-via header. SCP1 101A determines whether the next-hop SCP supports bundling. In this example, SCP2 101B is the next-hop SCP, and SCP2 101B supports bundling. Accordingly, SCP1 101A forwards the bundled notification request message to SCP2 101B, as indicated by line 2.

SCP2 101B receives the bundled notification request and performs a lookup for its FQDN in the vendor-bundle-via header. In this example, SCP2 101B finds its identity in the vendor-bundle-via header. SCP2 101B then determines whether its identity is the first identity in the vendor-bundle-via header. In this example, the FQDN of SCP2 101B is the first identity in the vendor-bundle-via header. Accordingly, SCP2 101B unbundles the notification request and generates individual notification request messages. In line 3, SCP2 101B sends the individual notification request message to consumer NFs 202.

In line 4 of the message flow diagram, consumer NFs 202 generate individual notification response messages and send the individual notification response messages to SCP2 101B. SCP2 101B receives the individual notification response messages and bundles the individual notification response messages. In line 5, SCP2 101B sends the bundled notification response message to producer NF 200 via SCP1 101A. SCP1 101A forwards the bundled notification response to producer NF 200.

Figure 5:
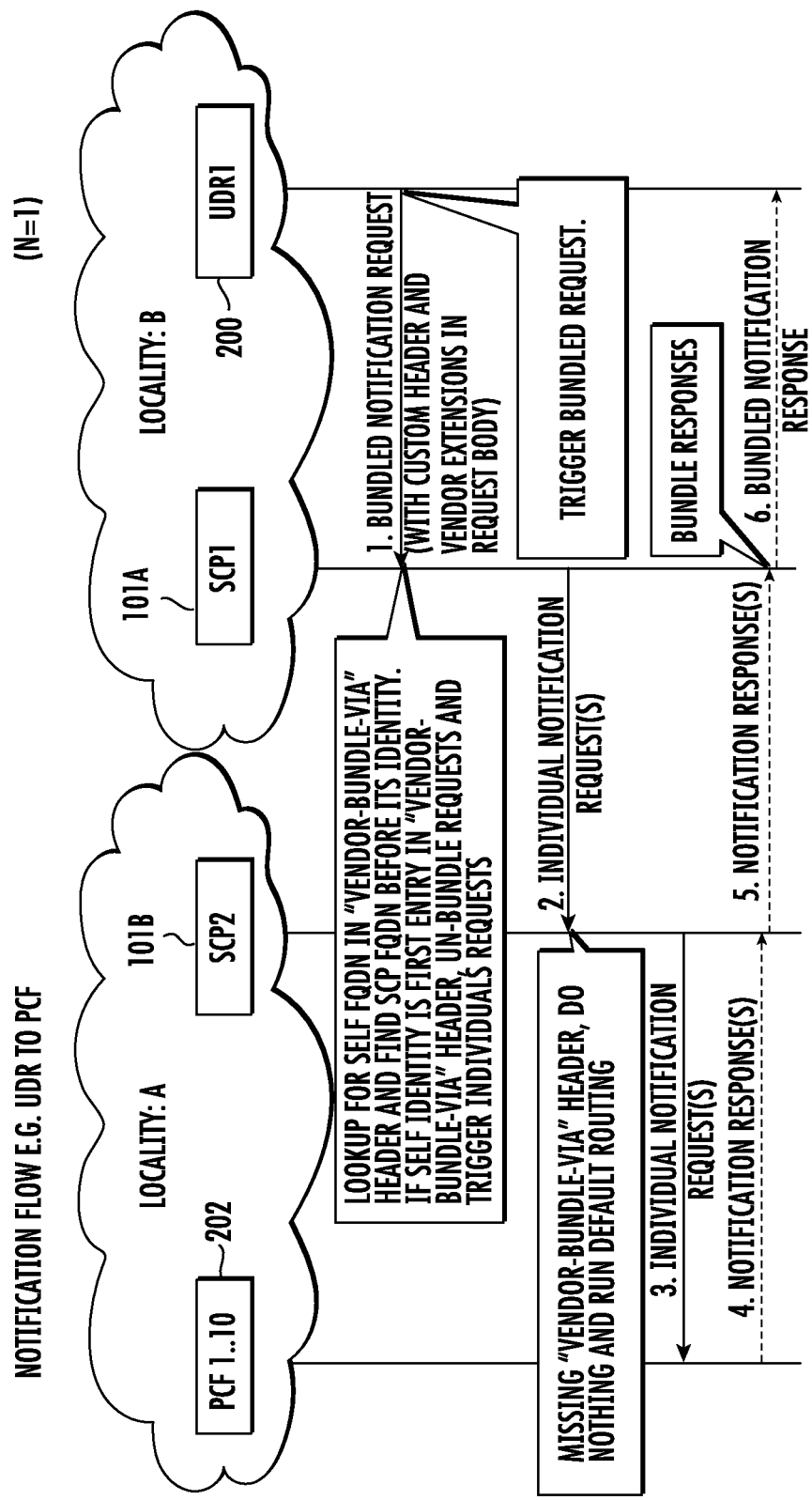
FIG. 5 is a message flow diagram illustrating exemplary messages exchanged when a producer NF generates and sends a bundled notification request message to SCPs, where N is equal to 1.

FIG. 5 is a message flow diagram illustrating exemplary messages exchanged when a producer NF generates and sends a bundled notification request message to SCPs, where N=1. Referring to FIG. 5, in line 1, producer NF 200, which in the illustrated example is a UDR, detects an event that requires notification to multiple consumer NFs, and, in response, generates and sends a bundled notification request message to SCP1 101A. SCP1 101A performs a lookup for its FQDN in the vendor-bundle-via header, finds its self FQDN in the vendor-bundle-via header, and determines that the FQDN of SCP1 101A is the first SCP identity in the vendor-bundle-via header. Because the self FQDN of SCP1 101A is the first identity in the vendor-bundle-via header, SCP1 101A unbundles the bundled notification request and, in line 2, generates and sends individual notification request messages to SCP2 101B. SCP2 101B receives the individual notification request messages and, in line 3, sends the individual notification request messages to consumer NFs 202. In line 4, consumer NFs 202 send individual notification response messages to SCP2 101B. SCP2 101B receives the individual notification response messages and, in line 5, routes the individual notification response messages to SCP1 101A. SCP1 101A receives the individual notification response messages, bundles the notification response messages, and, in line 6, sends the bundled notification response message to producer NF 200.

Figure 6:
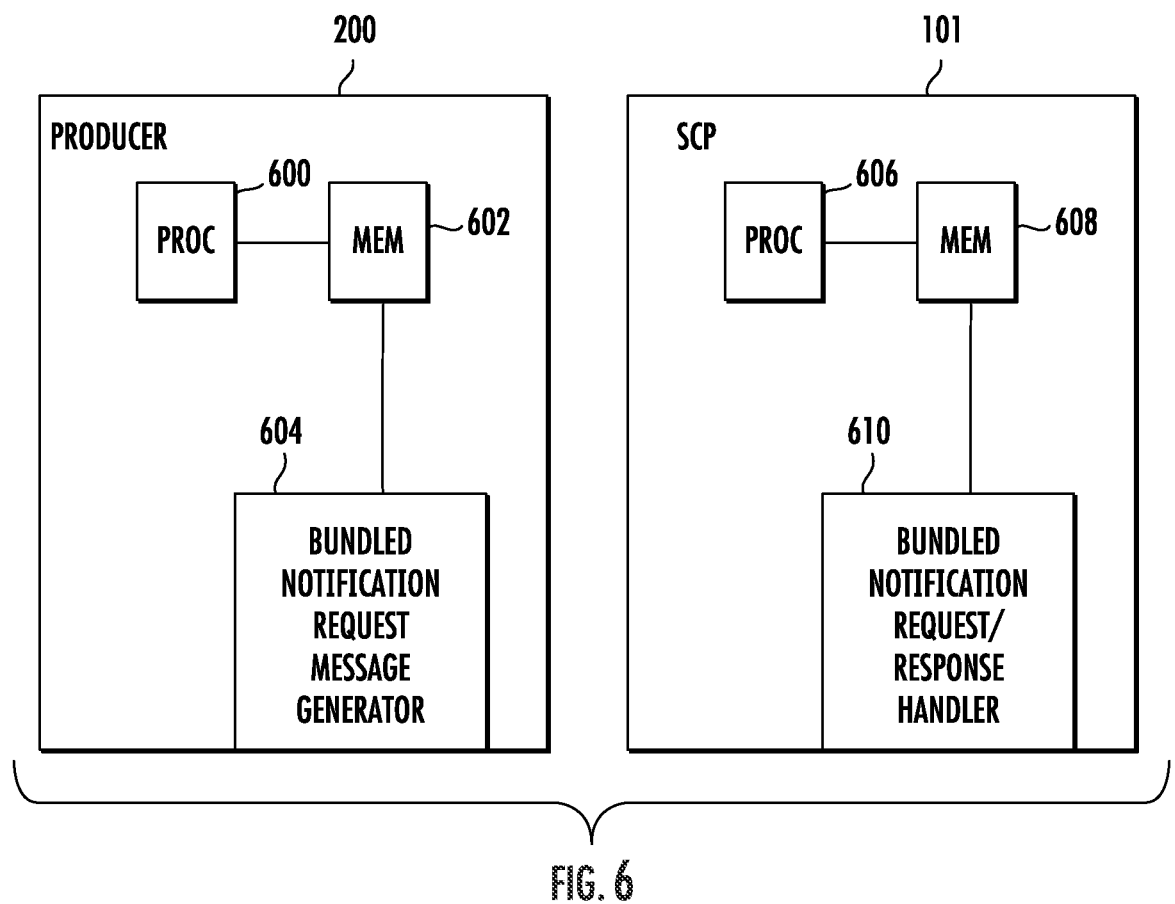
FIG. 6 is a block diagram illustrating exemplary architectures for a producer NF and an SCP in generating and processing bundled notification request messages.

FIG. 6 is a block diagram illustrating exemplary architectures for a producer NF and an SCP in generating and processing bundled notification request messages. Referring to FIG. 6, producer NF 200 includes at least one processor 600 and a memory 602. Producer NF 200 further includes a bundled notification request message generator 604 for generating bundled notification request messages and sending the bundled notification request messages to SCPs. Bundled notification request message generator 604 may be implemented using computer executable instructions stored in memory 602 and executed by processor 600. Producer NF 200 may be any of the NFs illustrated in figure one or other NF capable of receiving subscription requests and generating corresponding notification request messages when an event triggers notification under the condition specified in a subscription.

SCP 101 includes at least one processor 606 and a memory 608. SCP 101 further includes a bundled notification request/response handler 610 for processing bundled notification request messages and generating bundled notification response messages for the case where SCP 101 is responsible for unbundling a corresponding bundled notification request message. Bundled notification request/response handler 610 may be implemented using computer executable instructions stored in memory 608 and executed by processor 606.

Figure 7:
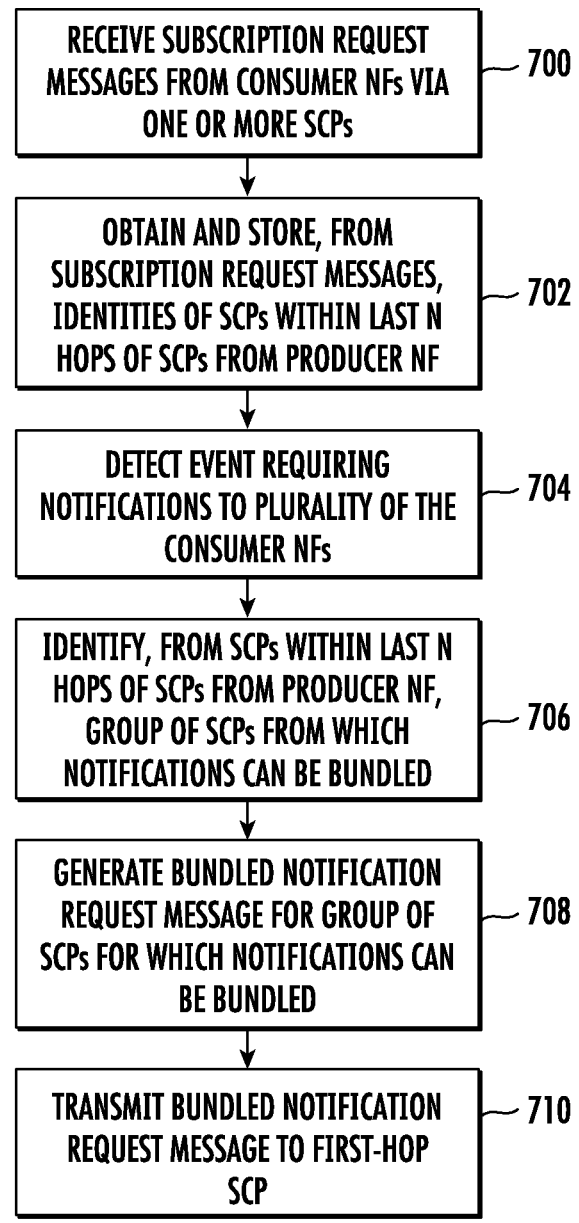
FIG. 7 is a flow chart illustrating an exemplary process for generating and processing bundled notification request messages.

FIG. 7 is a flow chart illustrating an exemplary process for generating and processing bundled notification request messages. Referring to FIG. 7, in step 700, the process includes receiving subscription request messages from consumer NFs via one or more SCPs. For example, a producer NF may receive messages from consumer NFs that request creation of subscriptions to receive notification of events that occur at producer NFs in the network. The messages may contain via headers that store the identities, in order, from the first SCP that the message encounters to the last SCP that the message encounters before reaching the producer NF.

In step 702, the process includes obtaining and storing, from the subscription request messages validated by the producer NF, identities of SCPs within the last N hops of SCPs from the producer NF, N being an integer of at least one. For example, the producer NF will read the via headers from the subscription requests and store the identities of the SCPs obtained from the via headers.

In step 704, the process includes detecting an event requiring notifications to a plurality of the consumer NFs. For example, the producer NF may detect that an event occurs which satisfies conditions specified by subscriptions created by more than one consumer NF.

In step 706, the process includes identifying, from the SCPs within the last N hops of SCPs, a group of SCPs for which the notifications can be bundled. For example, the producer NF may perform the steps described above to identify via groups of SCPs and generate bundled notification request messages for the subscriptions for which SCP via groups are identified.

In step 708, the process includes generating a bundled notification request message for the group of SCPs for which the notifications can be bundled. For example, the producer NF may include, in the bundled notification request message, the vendor-bundle-via header, which contains a list of identities of SCPs within N last hops of SCPs from the producer NF through which the bundled notification request message must travel to reach the consumer NFs. The bundled notification request message will be unbundled at the Nth-hop SCP, which unbundles the request and sends the individual notification request messages to or towards the consumer NFs. The bundled notification request message may also include custom data that enables the SCP that performs the unbundling to generate individual notification request messages that are specific to different consumer NFs.

In step 710, the process includes transmitting the bundled notification request message to a first-hop SCP in the group of SCPs for which the notifications can be bundled. For example, the producer NF may transmit the bundled notification request message to the first-hop SCP in the path for delivering the notifications to the consumer NFs. If N=1, the first-hop SCP unbundles the request and delivers individual notification request messages to the consumer NFs. If N>1, the first-hop SCP may deliver the bundled notification request message to the next-hop SCP which either unbundles or forwards the bundled notification request message based on the SCP logic described herein.

Thus, the subject matter described herein includes methods, systems, and computer readable media for generating and processing bundled notification request messages. By performing notification request message bundling as described herein, the processing burden on intermediate network nodes, such as SCPs, is reduced over the case where the intermediate network nodes process notification request messages with the same or similar content.

The disclosure of each of the following references is hereby incorporated herein by reference in its entirety.

REFERENCES 1. 3rd Generation Partnership Project; Technical Specification Group Core Network and Terminals; 5G System; Network Technical Realization of the Service-Based Architecture; Stage 3 (Release 17) 3GPP TS 29.500 V17.6.0 (2022-03)
2. 3rd Generation Partnership Project; Technical Specification Group Core Network and Terminals; 5G System; Network Function Repository Services; Stage 3 (Release 17) 3GPP TS 29.510 V17.4.0 (2021-12)
3. Fielding et al., Hypertext Transfer Protocol (HTTP/1.1): Message Syntax and Routing; IETF RFC 7230 (June 2014)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for generating and processing bundled notification request messages, the method comprising:
    at a producer network function (NF):
        receiving subscription request messages from consumer NFs via one or more service communication proxies (SCPs);
        obtaining and storing, from the subscription request messages validated by the producer NF, identities of SCPs within a last N SCP hops from the producer NF, N being an integer of at least one;
        detecting an event requiring notifications to a plurality of the consumer NFs;
        identifying, from the SCPs within the last N SCP hops from the producer NF, a group of SCPs for which the notifications can be bundled;
        generating a bundled notification request message for the group of SCPs for which the notifications can be bundled; and
        transmitting the bundled notification request message to a first-hop SCP in the group of SCPs for which the notifications can be bundled.

2. The method of claim 1 wherein obtaining the identities of SCPs within the last N SCP hops from the producer NF includes reading the identities of the SCPs from via headers in the subscription request messages.

3. The method of claim 1 wherein identifying the group of SCPs for which the notifications can be bundled includes identifying subscriptions for which notification request messages can traverse the same SCPs between the producer NF and the SCPs within the last N SCP hops from the producer NF.

4. The method of claim 1 wherein identifying the group of SCPs for which the notifications can be bundled includes identifying SCPs within the last N SCP hops from the producer NF that support notification request message bundling for notifications of a given type.

5. The method of claim 1 wherein generating the bundled notification request message includes adding, to the bundled notification request message, a vendor-bundle-via header containing the identities of the SCPs in the group of SCPs for which the notifications can be bundled.

6. The method of claim 1 wherein generating the bundled notification request message includes adding custom data to the bundled notification request message to change a body or a header of an individual notification request message for a particular consumer NF.

7. The method of claim 1 comprising, at the first-hop SCP, receiving the bundled notification request message and determining whether a vendor-bundle-via header is present in the bundled notification request message.

8. The method of claim 7 comprising, at the first-hop SCP, in response to determining that the vendor-bundle-via header is present, determining whether an identity of the first-hop SCP is present in the vendor-bundle-via header.

9. The method of claim 8 comprising, in response to determining that the identity of the first-hop SCP is present in the vendor-bundle-via header, determining whether the identity of the first-hop SCP is first in the vendor-bundle-via header, and, in response to determining that the first-hop SCP is first in the vendor-bundle-via header, unbundling the bundled notification request message and sending individual notification request messages to the consumer NFs.

10. The method of claim 8 comprising, in response to determining that the identity of the first-hop SCP is present in the vendor-bundle-via header, determining whether the identity of the first-hop SCP is first in the vendor-bundle-via header, and, in response to determining that the first-hop SCP is not first in the vendor-bundle-via header, determining whether a next-hop SCP identified in the vendor-bundle-via header supports bundled notifications, and, in response to determining that the next-hop SCP supports bundled notifications, proxying the bundled notification request message to the next-hop SCP.

11. A system for generating and processing bundled notification request messages, the system comprising:
    a producer network function (NF) including at least one processor and a memory comprising instructions executable by the at least one processor; and
    a bundled notification request message generator implemented by the instructions for receiving subscription request messages from consumer NFs via one or more service communication proxies (SCPs), obtaining and storing, from the subscription request messages validated by the producer NF, identities of SCPs within a last N SCP hops from the producer NF, N being an integer of at least one, detecting an event requiring notifications to a plurality of the consumer NFs, identifying, from the SCPs within the last N SCP hops from the producer NF, a group of SCPs for which the notifications can be bundled, generating a bundled notification request message for the group of SCPs for which the notifications can be bundled; and transmitting the bundled notification request message.

12. The system of claim 11 wherein the bundled notification request message generator is configured to obtain the identities of SCPs within the last N SCP hops from the producer NF by reading the identities of the SCPs from via headers in the subscription request messages.

13. The system of claim 11 wherein the bundled notification request message generator is configured to identify the group of SCPs for which the notifications can be bundled by identifying subscriptions for which notification request messages can traverse the same SCPs between the producer NF and the SCPs within the last N SCP hops from the producer NF.

14. The system of claim 11 wherein the bundled notification request message generator is configured to identify the group of SCPs for which the notifications can be bundled by identifying subscriptions for which notification request messages can traverse the same SCPs between the producer NF and the SCPs within the last N SCP hops from the producer NF.

15. The system of claim 11 wherein the bundled notification request message generator is configured to generate the bundled notification request message by adding, to the bundled notification request message, a vendor-bundle-via header containing the identities of the SCPs in the group of SCPs for which the notifications can be bundled.

16. The system of claim 11 wherein the bundled notification request message generator is configured to generate the bundled notification request message by adding, to the bundled notification request message, a vendor-bundle-via header containing the identities of the SCPs in the group of SCPs for which the notifications can be bundled.

17. The system of claim 11 wherein the bundled notification request message generator is configured to generate the bundled notification request message by adding, to the bundled notification request message, a vendor-bundle-via header containing the identities of the SCPs in the group of SCPs for which the notifications can be bundled.

18. The system of claim 17 wherein the first-hop SCP is configured to, in response to determining that the identity of the first-hop SCP is present in the vendor-bundle-via header, determine whether the identity of the first-hop SCP is first in the vendor-bundle-via header, and, in response to determining that the first-hop SCP is first in the vendor-bundle-via header, unbundle the bundled notification request message and sending individual notification request messages to the consumer NFs.

19. The system of claim 17 wherein the first-hop SCP is configured to, in response to determining that the identity of the first-hop SCP is present in the vendor-bundle-via header, determine whether the identity of the first-hop SCP is first in the vendor-bundle-via header, and, in response to determining that the first-hop SCP is not first in the vendor-bundle-via header, determine whether a next-hop SCP identified in the vendor-bundle-via header supports bundled notifications, and, in response to determining that the next-hop SCP supports bundled notifications, proxy the bundled notification request message to the next-hop SCP.

20. A non-transitory computer readable medium having stored thereon executable instructions that when executed by a processor of a computer control the computer to perform steps comprising:
at a producer network function (NF):
receiving subscription request messages from consumer NFs via one or more service communication proxies (SCPs);
obtaining and storing, from the subscription request messages validated by the producer NF, identities of SCPs within a last N SCP hops from the producer NF, N being an integer of at least one;
detecting an event requiring notifications to a plurality of the consumer NFs;
identifying, from the SCPs within the last N SCP hops from the producer NF, a group of SCPs for which the notifications can be bundled;
generating a bundled notification request message for the group of SCPs for which the notifications can be bundled; and
transmitting the bundled notification request message to a first-hop SCP in the group of SCPs for which the notifications can be bundled.

* * * * *